Aug. 19, 1941.  F. W. GODSEY, JR  2,253,026

ELECTRICAL CONDENSER

Filed Sept. 26, 1940

FRANK W. GODSEY, JR.  INVENTOR.

BY Dorsey, Cole & Garner

ATTORNEYS.

Patented Aug. 19, 1941

2,253,026

UNITED STATES PATENT OFFICE 2,253,026

ELECTRICAL CONDENSER

Frank W. Godsey, Jr., North Adams, Mass., assignor to Sprague Specialties Co., North Adams, Mass., a corporation of Massachusetts Application September 26, 1940, Serial No. 358,548

6 Claims. (Cl. 175—41)

The present invention relates to electrical condensers, and more particularly to novel improvements in condensers of fixed capacity value.

It is an object of the invention to provide a fixed capacity condenser characterized by a high degree of mechanical and electrical stability.

A further object is to provide a fixed capacity condenser which is small and compact, exhibits a high capacity value and which can be manufactured at a low cost.

In the manufacture of fixed-capacity condensers, variations in the effective area of the electrodes, in the thickness of the dielectric layers, etc., may cause large differences between the individual capacities of supposedly identical condensers. On the other hand, in many uses of these condensers, it is imperative that the capacity of the condenser is accurate within narrow tolerances.

It is therefore another object of the invention to provide a fixed capacity condenser which in manufacture is simply and inexpensively adjusted within narrow tolerances to a predetermined capacity value.

These and further objects of the invention will appear as the specification progresses.

The invention consists in novel methods of construction and arrangement of parts, which will be described in the specification and set forth in the appended claims.

More particularly, the invention relates to an improved fixed-capacity condenser comprising as its main elements, two circumjacent electrodes and an interposed dielectric layer which is intimately united with the electrodes.

In the drawing forming part of the specification:

Figure 1:
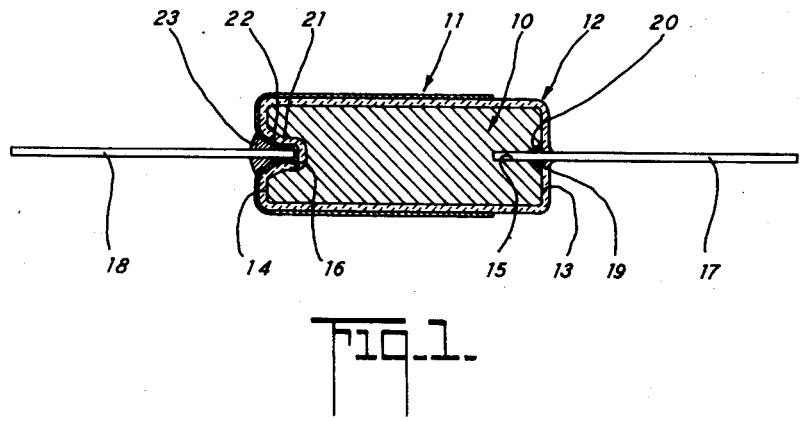
Figure 1 is a side view in cross-section of a condenser made in accordance with the invention.

Referring to Fig. 1, the condenser there shown comprises two concentrically disposed electrodes 10 and 11 and a dielectric layer 12 interposed between the electrodes.

Electrode 10 consists of a metal cylinder at the two end faces 13 and 14 of which there are provided shallow axial bores 15 and 16 respectively. The bore 15 is of such diameter as to snugly receive a flexible wire terminal lead 17 for the electrical connection of the electrode 10. The lead 17 is secured within the bore 15 by welding, brazing or the like, and for this the bore 15 is preferably countersunk at its open end as shown at 20, within which the lead is welded at 19.

The bore 16 has an interconical and an inner cylindrical part adapted to receive a flexible terminal wire 18 as later to be more fully described.

The dielectric 12 consists of a layer of an insulating material forming an integral coating on the surface of the cylinder 10, said coating also extending over the end faces 13 and 14 of the cylinder, whereby at the end face 13 it preferably covers the weld portion 19 but permits the terminal lead 17 to project through it, and at the end face 14 it forms a lining 21 of the bore 16.

The layer 12 consists preferably of a fused potassium lead silicate vitreous enamel as disclosed in the copending application of Stanley O. Dorst, Ser. No. 289,292, filed August 9, 1939. The layer 12 may consist of other suitable dielectric materials, for example, of other vitreous dielectric enamels or of other refractory dielectric materials capable of being applied to the surface of electrode 10 and of forming an integral coating on the surface thereof. Preferably the layer 12 is applied to the electrode 10 by cataphoretic deposition, as described in the copending application of Preston Robinson et al., Ser. No. 197,692, filed March 23, 1938, which process provides for a coating of uniform thickness throughout its area; the lining 21 being thereby also of uniform thickness and free of weak spots or other surface imperfections.

The outer electrode consists of a conducting metal coating 11 provided on the surface of the dielectric 12 and extends over the dielectric coating towards the end face 13 and also covers the end face 14, forming thereby a covering lining 22 over lining 21, and within which the terminal wire 18 is secured for example, by soldering, as shown at 23.

The coating 11 may be formed in one of several manners. For example, it may be applied by spraying finely divided copper on the dielectric layer 12, forming an adhering and homogeneous layer thereon. Preferably, the coating 11 consists of a thin layer or film of silver which is applied to the surface of the dielectric 12 by chemical deposition from a suitable silvering solution or by the decomposition of an organic silver salt painted or sprayed as a layer on the surface of the dielectric.

The condenser of the invention readily lends itself to the adjustment of its capacity value within close capacity tolerances. Such close tolerances are simply and inexpensively obtained by removing selected portions of the surface of the electrode 11, for example, by means of a grinding machine. Preferably, the grinding machine is provided with electrically insulated mandrels for holding the condenser during the grinding of the electrode 11. To such mandrels there may be connected a suitable capacity measuring device controlling the action of the grinding machine whereby the grinding is automatically stopped when the condenser is brought to the desired capacity value.

It is thus seen that the invention provides a fixed capacity condenser of great rigidity and mechanical strength, and which is compact, contains a minimum number of components and is readily adapted to low cost and mass production.

Moreover, since the components of the condenser are integrally united, their active surfaces are hermetically sealed from all external influences such as humidity and the like and the condenser exhibits a high degree of stability when subjected to such influences.

Figure 2:
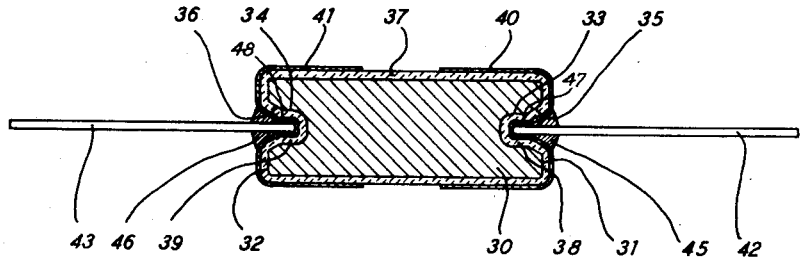
Fig. 2 is a side view in cross-section illustrating another embodiment of the invention.

In Fig. 2 there is shown the novel construction of the invention as applied to a fixed capacity condenser of low capacity value and/or of high breakdown voltage.

The condenser of Fig. 2 comprises a metal cylinder 30 at the two end faces 31 and 32 of which there are provided shallow axial bores 33 and 34 respectively. Each of the bores 33 and 34 are preferably countersunk for example, as shown at 35 and 36 respectively.

Disposed on the surface of cylinder 30 is an integral coating 37 of a vitreous dielectric material which coating extends over the end faces 31 and 32 of the cylinder 30 and forms within the bores 33 and 34 linings 38 and 39 respectively.

The electrodes of the condenser consist of conducting metal coatings 40 and 41 provided on the surface of the layer 37 and each extending towards end faces of the cylinder 30 and into the corresponding coated bores 33 and 34 forming therein linings 47 and 48 respectively. The electrodes 40 and 41 are formed in the manner previously described in connection with the electrode 11 of the condenser of Fig. 1.

External electrical connection to the electrodes 40 and 41 is provided by flexible wire leads 42 and 43 respectively, said leads being secured within the lined bores 33 and 34 respectively, and connected to the electrodes by soldering, for example, as shown at 44 and 45 respectively.

The invention has been described in connection with condensers in which the electrodes are cylindrical in cross-section. It should be well understood, however, that the principles of the invention are equally applicable to condensers with electrodes of other cross-sectional shapes, for example, of oval or rectangular cross-section.

While I have described my invention by means of specific examples and in specific embodiments, I do not wish to be limited thereto for obvious modifications will occur to those skilled in the art without departing from the spirit and scope of the invention.

What I claim is:

1. An electrical condenser comprising a metal core having an end face, a bore in said end face, a dielectric layer forming an integral coating on the surface of said core and extending over said end face and forming a lining within said bore, a condenser electrode comprising a metal coating integrally disposed on the surface of said dielectric layer and circumjacent to said core, and terminal means for said electrode comprising a member disposed in said lined bore and secured to the surface of said electrode.

2. An electrical condenser comprising a center electrode having two end faces, a bore in each of said end faces, a dielectric layer forming an integral coating on the surface of said electrode and extending over one end face and forming a lining in the bore thereof, a second electrode comprising a metal coating integrally disposed on the surface of the dielectric layer, terminal means for said condenser, said means comprising a wire element disposed in the lined bore and secured to the metal coating and a second wire element secured within the center electrode.

3. An electrical condenser comprising a metal core having two end faces, a bore in each of said end faces, a dielectric layer integrally disposed on the surface of said core and extending over said end faces and forming a lining within said bores, two metal coatings integrally disposed on the surface of said dielectric layer and extending over the opposing end faces of said core, terminal means for said condenser, said means comprising wire elements disposed in said lined bores and secured to said metal coatings.

4. An electrical condenser comprising a metal cylinder having two end faces, an axial bore in one of said end faces, a dielectric layer forming a fused integral coating on the surface of said cylinder and extending into said bore and forming a lining therein, a condenser electrode comprising a metal coating integrally disposed on the surface of said dielectric layer, and terminal means for said electrode comprising a wire element disposed in said lined bore and secured to said coating.

5. An electrical condenser comprising a cylindrical electrode having two end faces, an axial bore in each of said end faces, a dielectric layer forming an integral fused coating on the surface of said electrode and extending over one of said end faces and forming a lining in the bore thereof, a second electrode comprising a concentric metal coating integrally disposed on the surface of the dielectric layer, terminal means for said condenser, said means comprising a wire element disposed in the lined bore and secured to the metal coating and a second wire element secured within the other bore of said cylindrical electrode.

6. An electrical condenser comprising a metal cylinder having two end faces, an axial bore in each of said end faces, a dielectric layer integrally disposed on the surface of said cylinder and extending over said end faces and forming a lining within each of said bores, two metal coatings integrally disposed on the surface of said dielectric layer and extending over the opposing end faces of said cylinder, terminal means for said condenser, said means comprising wire elements dsposed in said lined bores and secured to said metal coatings.

FRANK W. GODSEY, Jr.